United States Patent [19]

Metraux

[11] Patent Number: 4,922,982
[45] Date of Patent: May 8, 1990

[54] ANTI-SKID DEVICE FOR WHEELS

[75] Inventor: Michel Metraux, Pully, Switzerland

[73] Assignee: Autotyp S.A., Etagnieres, Switzerland

[21] Appl. No.: 261,211

[22] Filed: Oct. 24, 1988

[30] Foreign Application Priority Data

Oct. 22, 1987 [EP] European Pat. Off. ........ 87115502.4

[51] Int. Cl.$^5$ ............................................. B60C 27/12
[52] U.S. Cl. .................................. 152/216; 152/217; 152/223; 152/241
[58] Field of Search ............... 152/213 R, 213 A, 214, 152/216, 217, 218, 233, 241, 208, 225 R; 301/42; 29/433, 446

[56] References Cited

U.S. PATENT DOCUMENTS 2,584,625  2/1952  Schwab .
4,388,754  6/1983  Ilon ..................................... 152/217
4,799,522  1/1989  Ilon ................................. 152/213 R

FOREIGN PATENT DOCUMENTS 1680436  8/1971  Fed. Rep. of Germany .
3545528  7/1987  Fed. Rep. of Germany .
2540443  8/1984  France .

Primary Examiner—Michael W. Ball
Assistant Examiner—Gregory J. Wilber
Attorney, Agent, or Firm—Foley & Lardner, Schwartz, Jeffery, Schwaab, Mack, Blumenthal & Evans

[57] ABSTRACT

An anti-skid device for a vehicle wheel is provided comprising an axial part having a plurality of arms extending therefrom which are attached to an anti-skid assembly, such as a snow chain arrangement. The axial part includes a securing device which rotates freely relative to the axial part for securing the anti-skid device to the vehicle wheel. Thus, the rotary motion of the anti-skid assembly around the wheel is not transferred to the securing device.

10 Claims, 4 Drawing Sheets

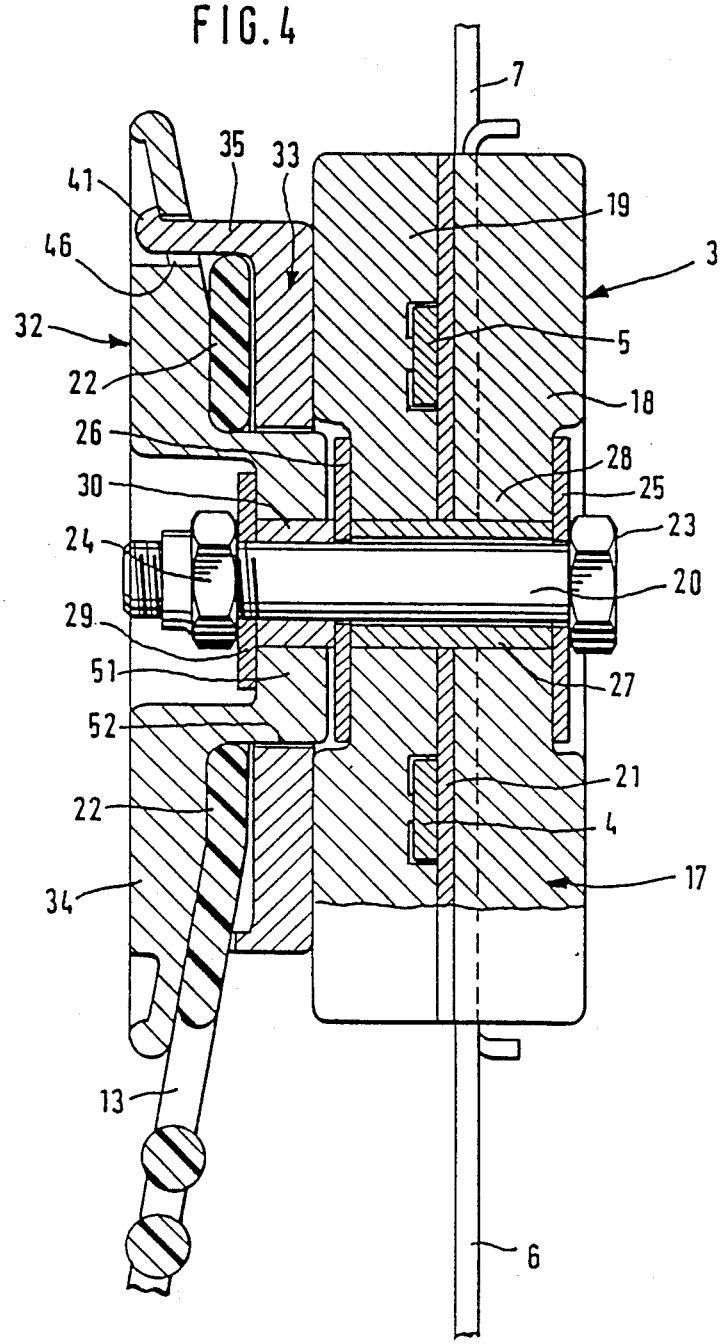

4,922,982

ANTI-SKID DEVICE FOR WHEELS

BACKGROUND OF THE INVENTION

1. Field of the Invention

The invention relates to anti-skid devices for wheels, and more particularly to an anti-skid device wherein the rotary motion of the anti-skid means around the wheel is not transferred to the means which secures the anti-skid device to the wheel.

2. Discussion of the Related Art

Anti-skid devices are well-known in the art. These devices consist generally of an anti-skid means, such as a chain, which is placed around the portion of the wheel which contacts the roadway. The anti-skid means are secured to the wheel rim through a mounting device which draws the anti-skid means toward the center of the wheel.

A representative anti-skid device is described in German reference No. 3,545,528. In the case of this anti-skid device, the securing means consist of rubber ties which run as individual parts around protuberances behind a mounting part and which have hooking elements for securing the anti-skid device to the rim.

It has been found that these rubber ties become worn after a short time due to the friction against these protuberances because dirt particles get between the friction surfaces of these parts during driving. In addition, it would be quite easy to hook the rubber ties on to the rim improperly since it is not possible to prevent two adjacent rubber ties from being hooked crossways or each rubber tie from being twisted.

In the case of the anti-skid device mentioned above, the mounting part with the rubber ties and two mounting parts with the arms are located on a bolt. By tightening a nut on the bolt, the mounting parts with the arms are pressed firmly toward each other in order to hold these retaining parts in their predetermined positions in relation to each other during driving, the pressure between the mounting parts not being so great that the mounting parts cannot be twisted in relation to each other out of these positions for compactly stowing the anti-skid device.

By tightening the nut, the mounting part with the rubber ties is also pressed firmly against one of the mounting parts with the arms and, as a result, a freely rotating movement between the mounting part with the rubber ties and the mounting parts with the arms is not possible. A freely rotating movement between the mounting part with the securing means, that is, with the rubber ties, and the two mounting parts with the arms is, however, a prerequisite for making possible satisfactory rotary motion of the anti-skid means around the wheel without this rotary motion being transferred to the securing means and disadvantageously loading the latter.

SUMMARY OF THE INVENTION

The object of this invention is to eliminate these problems with the prior art so that the securing means last longer.

A further object of this invention is to provide an anti-skid device wherein the axial mounting part and the securing means are freely rotatable in relation to each other, so that the rotary motion of the anti-skid means around the wheel cannot be transferred to the securing means.

Another object of this invention is to prevent the improper fitting of the securing means on the wheel.

A further object of this invention is to provide an anti-skid device wherein the securing means have free rotary motion in relation to the mounting parts with the arms, while maintaining the mounting parts under pressure.

A still further object of this invention is to provide an anti-skid device wherein securing means are integrated with a central part, so that there is no need for each securing member to be fitted separately.

Yet another object of this invention is to provide an anti-skid device wherein the durability of the integrated center part is significantly improved because there are no friction surfaces exhibiting dirt particles and wherein the securing members cannot be fitted crossways or twisted.

A further object of this invention is to provide a device having a rotatable securing means which is sealed from snow or dirt.

The foregoing and additional objects are attained by providing an anti-skid device for a vehicle wheel comprising an axial part having a plurality of arms extending therefrom which are attached to an anti-skid assembly, such as a snow chain arrangement. The axial part includes a securing device which rotates freely relative to the axial part for securing the anti-skid device to the vehicle wheel. Thus, the rotary motion of the anti-skid assembly around the wheel is not transferred to the securing device.

BRIEF DESCRIPTION OF THE DRAWINGS

FIG. 4 is a sectional view of the axial part of the anti-skid device according to the present invention.

DETAILED DESCRIPTION OF THE PREFERRED EMBODIMENTS

Figure 1:
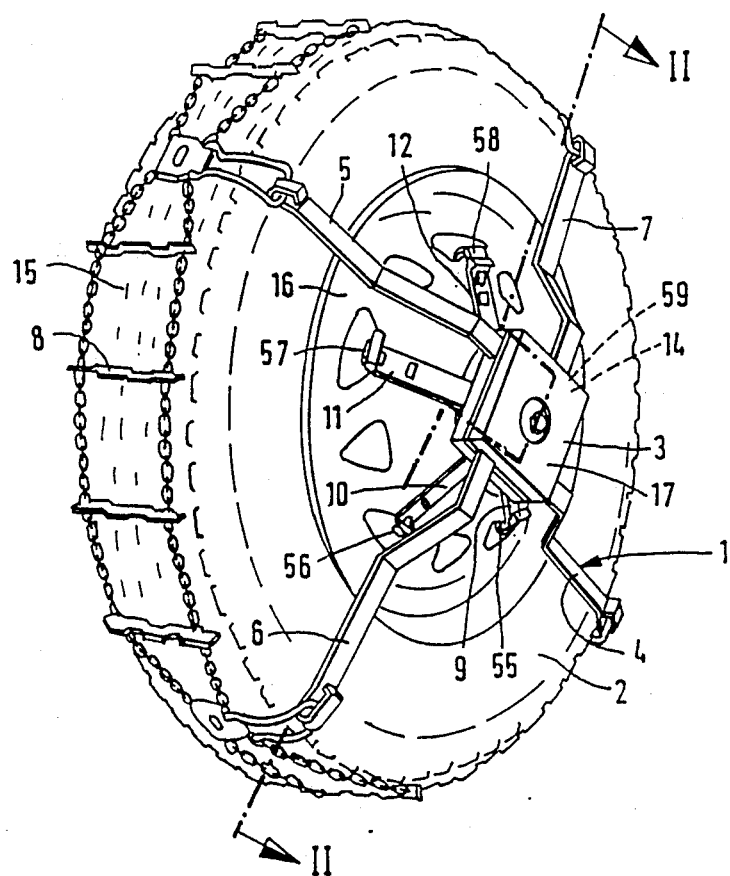
FIG. 1 is a perspective view of an anti-skid device according to the present invention.

As illustrated in FIG. 1, the present invention comprehends an anti-skid device, defined generally by the reference number 1, mounted on a wheel 2. The anti-skid device 1 comprises generally an axial part 3 having arms 4-7 extending therefrom, the arms 4-7 being attached to an anti-skid means 8, which in FIG. 1 is depicted as a chain arrangement. A plurality of securing members 9-13 extend from said axial part 3 and secures the same to wheel 2.

To install the anti-skid device 1, the axial part 3 is placed next to the outside 14 of the wheel 2 at the axis of rotation, and the anti-skid means 8 is placed around the tread 15 of the wheel 2. The upper portion of the anti-skid means 8, which has diameter greater than that of tread 15, is laid first around the top of the wheel 2 onto the tread 15, while the lower portion is laid near the bottom of the wheel next to the part of the tread 15 which is in contact with the roadway and therefore blocked. Thereafter, one securing member 9-13 after the other is tensioned and hung on to the wheel 2, preferably over edges of the rim holes of rim 16. Since the securing members 9-13 are under tension after fitting on the wheel, they load the axial part 3 in the direction of the wheel 2.

When the vehicle advances, the wheel rolls, the portion of the wheel previously in contact with the roadway is released, and the securing members 9-13 draw the parts of the anti-skid means 8 initially lying next to the tread 15 onto the tread 15. All parts of the anti-skid means 8 surround the tread 15 after a few revolutions of the wheel 2 and the anti-skid means 8 is held in this fitted state by the securing members 9-13 while stationary and also during rolling of the wheel 2.

The anti-skid means 8 can move around the tread 15 and, during rolling of the wheel 2, is automatically tensioned against the part of the tread 15 which is behind the roadway center portion of the tread.

Figure 2:
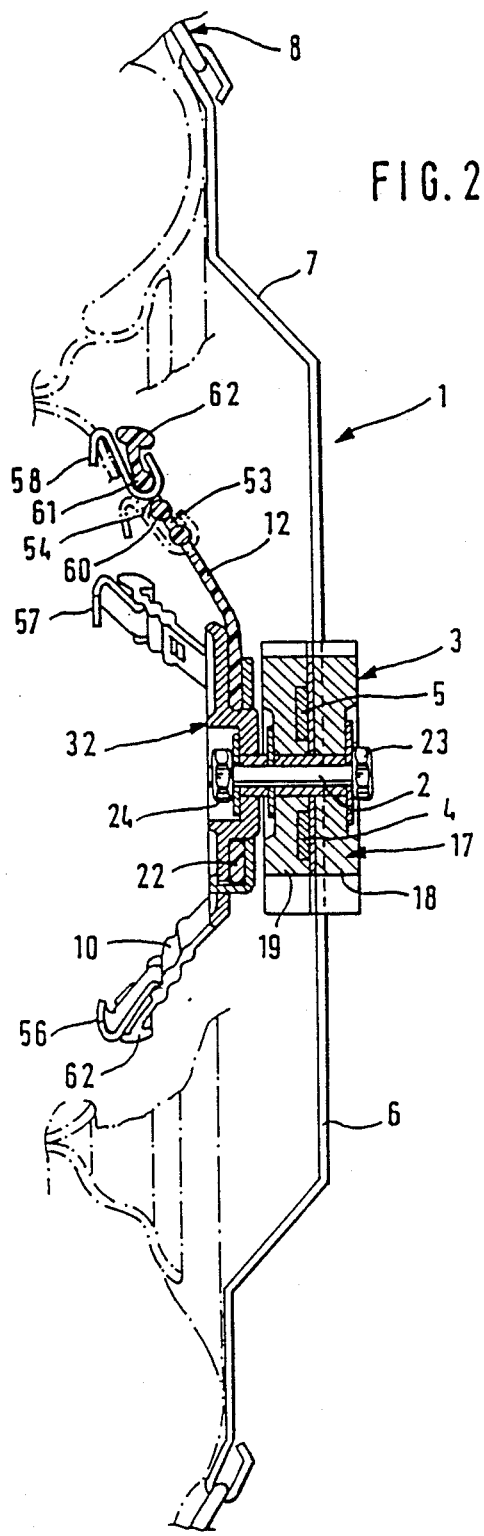
FIG. 2 is a cross-sectional view taken along the line II—II in FIG. 1.

Referring now to FIG. 2, the axial part 3 has a retaining part 17 which comprises a pair of mounting parts 18, 19. The mounting parts 18, 19 are rotatably mounted in relation to each other on a spindle 20, so the anti-skid device 1 can be folded together after use. Each mounting part 18, 19 has two elongated recesses wherein arms 4-7 are displacably mounted. Between the mounting parts 18, 19 lies a plate 21 which, among other things, prevents the arms of the one mounting part from coming into direct contact with the arms of the other mounting part. Also mounted on the spindle 20 are the securing members 9-13. In order not to transfer the movement of the anti-skid means 8 around the tread 15 onto the securing members 9-13, the securing members 9-13 and the retaining part 17 are arranged rotatably in relation to one another.

Figure 3:
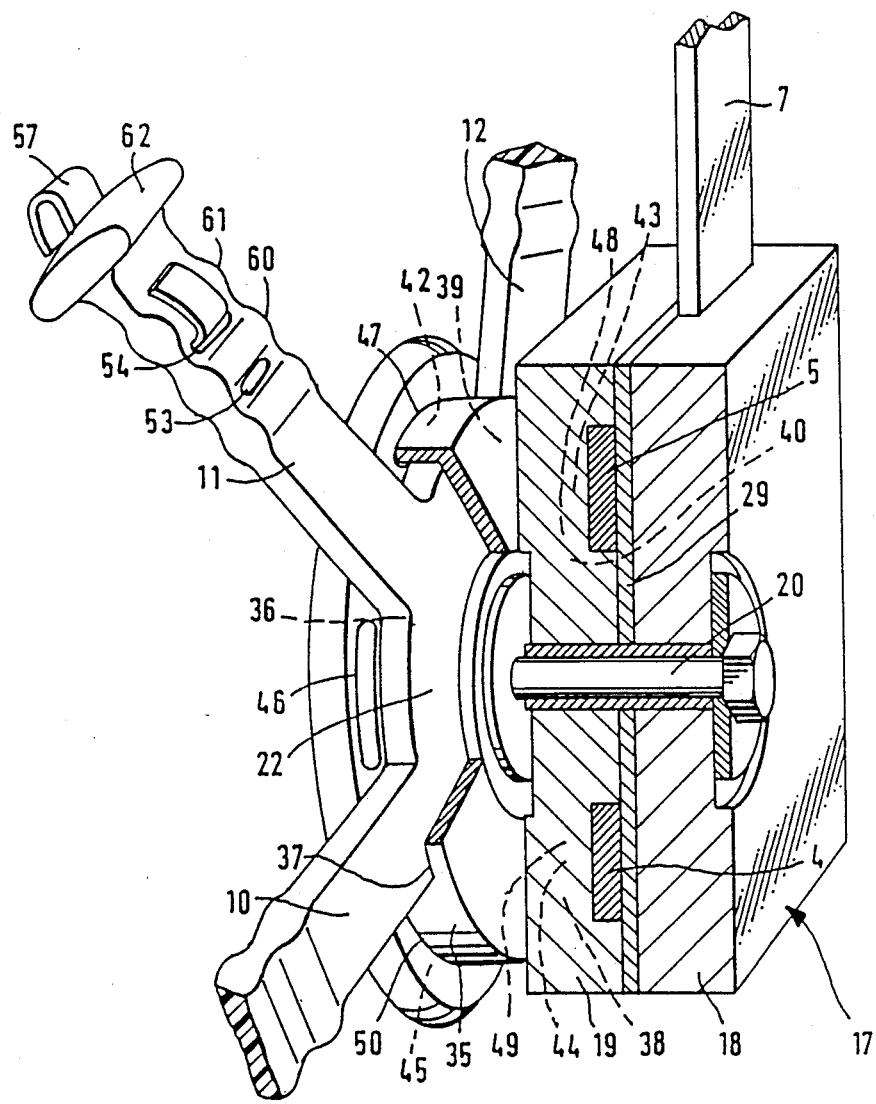
FIG. 3 is a perspective view of an axial, mounting-part of the anti-skid device according to the present invention.

Referring now to FIGS. 3 and 4, there is shown the securing means rotatably attached to retaining part 17. Securing members 9-13 are integrated with a central portion 22, and this central portion 22 and the retaining part 17 are arranged between a pair of clamping parts 23, 24 on the spindle 20. In the fitted state, the clamping parts 23, 24 exert a pressure on the mounting parts 18, 19, as a result of which the latter cannot move relative to each other. The central portion 22 integral with securing members 9-13 is, however, mounted rotatably in relation to the retaining part 17 irrespective of the pressure of the clamping parts 23, 24. Thus, the rotary motion of the anti-skid means 8, of the arms 4-7 and consequently of the retaining part 17 during rolling of the wheel 2 is not transferred to the central portion 22 and securing members 9-13, regardless of whether the mounting parts 18, 19 are clamped firmly or less firmly against each other by the clamping parts 23, 24.

Although this can be achieved by various part designs, the preferred embodiment illustrated in the drawings is particularly advantageous. In the preferred embodiment, the spindle 20 consists of a threaded bolt. The one clamping part 23 consists of the head of the threaded bolt, and the other clamping part 24 consists of a nut screwed onto the threaded bolt. On the spindle 20 there are two plates 25, 26 having a sleeve 27 therebetween. Since the sleeve 27 is somewhat shorter than ;the section of mounting parts 18, 19 between plates 25, 26, tightening clamping parts 23, 24 holds mounting parts 18, 19 together.

Between the plate 26 and a third plate 29 there is mounted a second sleeve 30 and, on this second sleeve 30, the central portion 22 is mounted directly or via a housing part 52 having axial clearance. In order to ensure an adequate axial clearance, the sleeve 30 is longer than the housing part 51 mounted thereon. The three plates 25, 26, 29 and the two sleeves 27, 30 are clamped against each other by the clamping parts 23, 24, as a result of which a tension between the mounting parts 18, 19 is produced in the direction toward each other by tightening of the nut 24, while the retaining part 17 and the central portion 22 remain freely rotatable in relation to each other.

The securing means comprises a central portion 22 arranged in a housing 32, which consists of a shell-shaped housing part 33 and a housing end wall 34 fastened thereto. The side wall 35 of the shell-shaped housing part 33 has openings 36-40, which are provided for the securing members 9-13. (Only opening 37 for securing member 10 is shown (FIG. 3).). In addition, the side wall 35 has five hooks 41-45 (only hook 41 is shown (FIG. 4)) between the openings 36-40, and these hooks 41-45 engage in corresponding openings 46-50 (only opening 46 is shown (FIGS. 3 and 4)) in the housing end wall 34 and secure the latter in place on the shell-shaped housing part 33.

The size of the openings 36-40 in the side wall 35 preferably corresponds to the size of the parts of securing members 9-13 which pass through the openings. The housing end wall 34 forms a seal against the shell-shaped housing part 33, thereby preventing dirt, ice or snow from getting into the housing 32.

The housing 32 is mounted via the part 51 of the housing end wall 34 on the sleeve 30 with axial clearance and this part 51 protrudes through an opening 52 into the shell-shaped housing part 33 thereby forming a seal. As a result, the housing 32 is also sealed off from the inside.

The central portion 22 and the securing members 9-13 integrated therewith preferably consist of the same flexible material, for example vulcanized or unvulcanized rubber. Each securing member 9-13 has a plurality (for example two) of openings 53, 54 or thin sections for preferably S-shaped hooks 55-59 (only 56-58 are shown (FIGS. 2 and 3)). The openings 53, 54 or the thin sections are arranged one after the other in relation to the central portion 22 and through them the hooks 55, 59 can be pressed and thereby arranged on the respective securing members 9-13. This makes it possible to arrange the hooks 55-59 in various positions on the securing members 9-13, as a result of which the hooks can be hooked firmly onto various types of rims. Each securing member 9-13 has, in addition, a plurality (for example two) of traversely running thickened portions 60, 61 around which parts of the hooks 55-59 are pressed, so that the hooks are firmly attached to the securing members 9-13. The end section of each securing member 9-13 preferably has the shape of traversely running grips 62, as a result of which the corresponding securing member can be better seized and tensioned and the respective hook 55-59 can be hooked more easily.

It should become obvious to those skilled in the art that this invention is not limited to the preferred embodiments shown and described. In addition to encompassing wheels other than vehicle wheels and rims of various structures, it is understood that the anti-skid means 8 may be designed other than as an anti-skid chain. It is also possible to arrange varying members of arms on each mounting part 18, 19. The spindle 20 may consists of an element other than a bolt and such an element may possibly have two threads on the two end portion and two nuts. Also, the clamping parts 23, 24, may consist of elements other than a nut and the head of a bolt.

The shape of the central portion 22, the shape and number of the securing members 9-13 integrated therewith and the shape of the housing 32 may also be different. Finally, it is understood that the central portion 22 with the securing members 9–13 may consist of a flexible material other than vulcanized or unvulcanized rubber and that these parts and/or have reinforcements. Also, the hooks 55–59 may be S-shaped, C-shaped, or T-shaped in order to be able to be hooked into the holes of various types of wheels.

What is claimed is:

1. An anti-skid device for a wheel having an inner rim portion and an outer circumferential portion, comprising;
    an axial part located at an axis of rotation of the wheel;
    said axial part having a securing means facing the wheel for securing said axial part to the inner rim portion and a retaining portion facing away from the wheel;
    a rotation means connecting said securing means and said retaining portion;
    said securing means thereby being freely rotatable about said rotation means relative to said retaining portion;
    a plurality of attaching arms extending from said retaining portion;
    an anti-skid means attached to said attaching arms;
    said anti-skid means being disposed about said outer circumferential portion of the wheel;
    said securing means having a plurality of securing members extending from a central portion;
    said securing members having attaching means disposed at distal ends thereof for attaching said securing members to the inner rim portion thereby drawing said anti-skid means toward the axis of rotation of the wheel and drawing said axial part toward the wheel;
    said central portion located about the axis of rotation of the wheel, said central portion being one piece with said plurality of securing members; and
    a housing sealably disposed about said central portion to prevent dirt, ice or snow from interfering with rotation of said central portion.

2. The anti-skid device according to claim 1 wherein said housing comprises:
    a first housing member disposed between said central portion and said retaining portion;
    said first housing member having a side wall extending toward the inner rim;
    said side wall having a plurality of holes disposed therein through which said securing members extend; and
    a second housing member disposed between said central portion and said inner rim;
    said second housing member having a central collar disposed about the axis of rotation of the wheel sealably extending through said central portion and said first housing member;
    said second housing member having a plurality of slots disposed therein;
    said side wall of said first housing member having a plurality of connecting means sealably extending through said slots thereby joining said first and second housing members.

3. The anti-skid device according to claim 1 wherein said retaining portion comprises:
    a first and second mounting members;
    a plate disposed between said first and second mounting members;
    each of said first and second mounting members having at least one recess defined therein bordering said plate for receiving said plurality of attaching arms; and
    a clamping means for holding together said first and second mounting members.

4. The anti-skid device according to claim 1 wherein said rotation means comprises a spindle.

5. The anti-skid device according to claim 2 wherein said rotation means comprises:
    a threaded bolt extending sealably through said central collar of said housing and through said retaining portion;
    a cylindrical sleeve disposed about a portion of said threaded bolt not contained in said retaining portion;
    said threaded bolt passing through a first and second plate member;
    said first plate member abutting the end of said cylindrical sleeve facing the wheel;
    said second plate member abutting the end of said cylindrical sleeve facing away from said wheel.

6. The anti-skid device according to claim 5, wherein said securing members are formed from a material selected from the group consisting of vulcanized rubber and unvulcanized rubber.

7. A securing means for anti-skid devices comprising:
    a central portion having a plurality of securing members extending therefrom;
    said securing members having attaching means disposed at distal ends thereof; and
    a rotation means connecting said central portion to a portion of said anti-skid device;
    said central portion being freely rotatable about said rotation means relative to said anti-skid device; and
    a housing sealably disposed about said central portion to prevent dirt, ice or snow from interfering with rotation of said central portion.

8. The securing means for anti-skid devices according to claim 7, wherein said housing comprises:
    a first housing member disposed about an obverse side of said central portion; and
    a second housing member disposed about a reverse side of said central portion;
    said first housing member having a side wall extending toward said second housing member;
    said side wall having a plurality of holes disposed therein through which said securing members extend;
    said second member having a plurality of slots disposed therein;
    said side wall of said first housing member having a plurality of connecting means sealably extending through said slots and thereby joining said first and second housing members.

9. The securing means for anti-skid devices according to claim 8, wherein said second housing member further comprises a central collar sealably extending through said central portion and said first housing member.

10. The securing means for anti-skid devices according to claim 9, wherein said securing members are formed from a material selected from the group consisting of vulcanized rubber and unvulcanized rubber.

* * * * *